(12) United States Patent
Yamaguchi

(10) Patent No.: US 8,754,964 B2
(45) Date of Patent: Jun. 17, 2014

(54) DEFECTIVE PIXEL DATA CORRECTING APPARATUS, IMAGE CAPTURING APPARATUS, AND METHOD FOR CORRECTING DEFECTIVE PIXEL DATA

(75) Inventor: Toshiro Yamaguchi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 359 days.

(21) Appl. No.: 12/838,101

(22) Filed: Jul. 16, 2010

(65) Prior Publication Data

US 2011/0032393 A1 Feb. 10, 2011

(30) Foreign Application Priority Data

Aug. 7, 2009 (JP) .................................. 2009-184830

(51) Int. Cl.
*H04N 5/217* (2011.01)
*H04N 9/64* (2006.01)

(52) U.S. Cl.
USPC .......................................... 348/241; 348/247

(58) Field of Classification Search
USPC ............................ 348/241, 244, 246, 247, 187
See application file for complete search history.

(56) References Cited

U.S. PATENT DOCUMENTS

| 6,683,643 | B1 * | 1/2004 | Takayama et al. ............. 348/247 |
| 6,819,358 | B1 * | 11/2004 | Kagle et al. .................... 348/246 |
| 7,812,867 | B2 * | 10/2010 | Okado ........................... 348/247 |
| 2002/0105597 | A1 * | 8/2002 | Janko et al. .................... 348/700 |
| 2005/0231617 | A1 | 10/2005 | Kitani |
| 2008/0117318 | A1 * | 5/2008 | Aoki .............................. 348/246 |
| 2008/0180554 | A1 * | 7/2008 | Kobayashi et al. ............ 348/246 |
| 2010/0073526 | A1 * | 3/2010 | Watanabe et al. .............. 348/247 |

FOREIGN PATENT DOCUMENTS

| CN | 101188678 A | 5/2008 |
| JP | 01-103374 A | 4/1989 |
| JP | 2003-116033 A | 4/2003 |
| JP | 2005-260453 A | 9/2005 |
| JP | 2008-131273 | 6/2008 |

OTHER PUBLICATIONS

The above references were cited in a Sep. 10, 2012 Chinese Office Action, a which is enclosed with English Translation, that issued in Chinese Patent Application No. 201010251940.X.
The above references were cited in a Feb. 15, 2013 Japanese Office Action, a which is enclosed without an English Translation, that issued in Japanese Patent Application No. 2009-184830.

* cited by examiner

*Primary Examiner* — Trung Diep
(74) *Attorney, Agent, or Firm* — Cowan, Liebowitz & Latman, P.C.

(57) ABSTRACT

Among defective pixels of an image sensor, defective pixels which need to be corrected are determined depending on the type and defect level for individual defective pixels and on image capturing conditions. Depending on the types of the defective pixels, the correspondences between the image capturing conditions and the defect levels of the defective pixels to be corrected are prepared in advance, thereby carrying out appropriate defective pixel correction in view of the fact that the dependence of the abnormal signal output level on the image capturing conditions differs depending on the type of defective pixel.

6 Claims, 9 Drawing Sheets

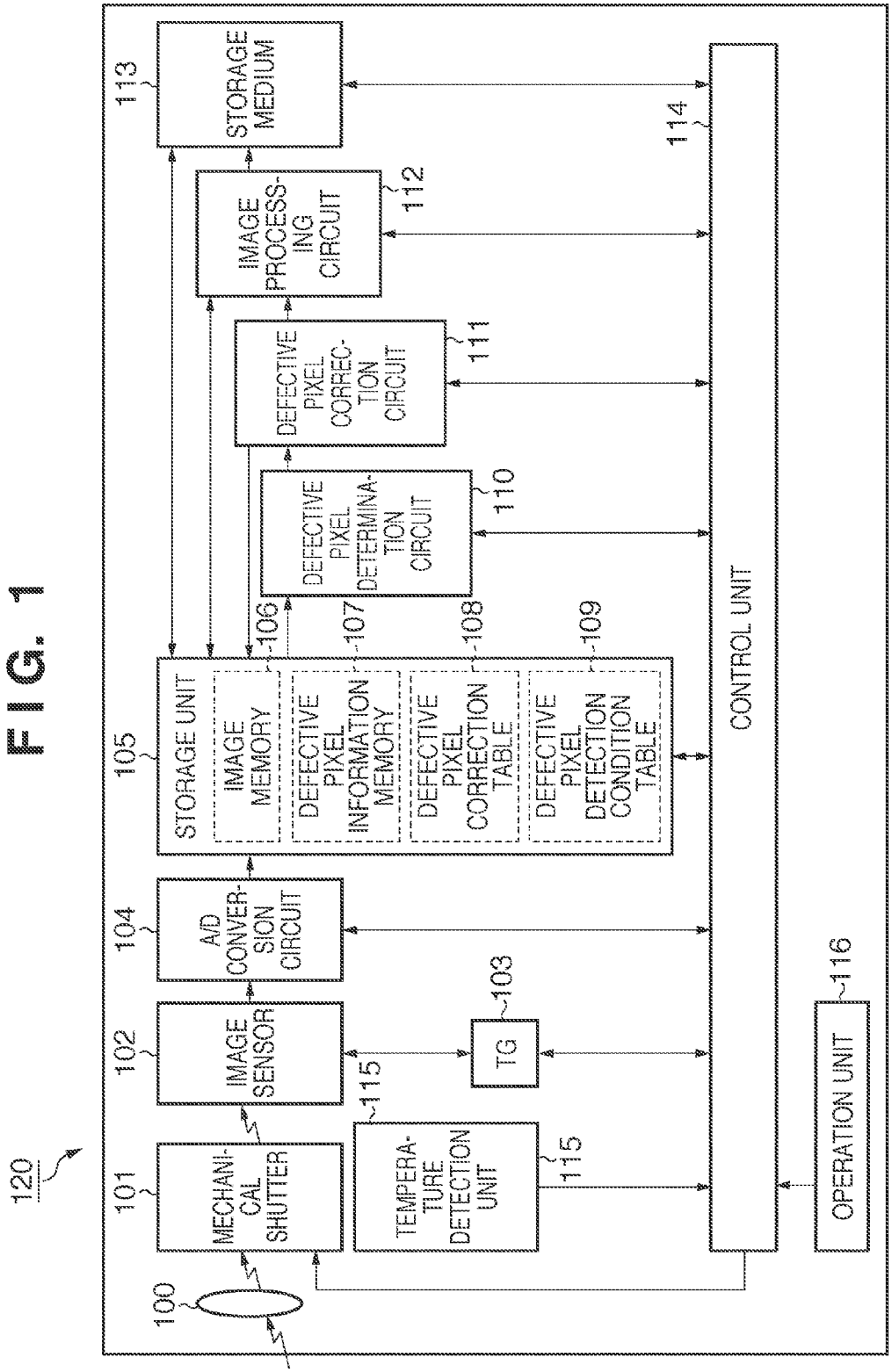

| | TEMPERATURE | CHARGE ACCUMULATION PERIOD | FREQUENCY OF IMAGE CAPTURING |
|---|---|---|---|
| CAPTURING CONDITIONS FOR NONSTEADY DEFECTIVE PIXEL DETECTION | 25°C OR LESS | 1/1000s | 32 TIMES PEAK HOLD |
| CAPTURING CONDITIONS FOR STEADY DEFECTIVE PIXEL DETECTION | 35°C~40°C | 2s | ONCE |

| $R_{11}$ | $Gr_{21}$ | $R_{31}$ | $Gr_{41}$ | $R_{51}$ |
|---|---|---|---|---|
| $Gb_{12}$ | $B_{22}$ | $Gb_{32}$ | $B_{42}$ | $Gb_{52}$ |
| $R_{13}$ | $Gr_{23}$ | $R_{33}$ | $Gr_{43}$ | $R_{53}$ |
| $Gb_{14}$ | $B_{24}$ | $Gb_{34}$ | $B_{44}$ | $Gb_{54}$ |
| $R_{15}$ | $Gr_{25}$ | $R_{35}$ | $Gr_{45}$ | $R_{55}$ |

| DEFECT ID_n (2bit) | TYPE OF DEFECT | ACCUMULATION PERIOD DEPENDENCE | TEMPERATURE DEPENDENCE | ISO SPEED DEPENDENCE |
|---|---|---|---|---|
| 00 | NONSTEADY DEFECTIVE PIXEL | NO | NO | YES |
| 01 | STEADY DEFECTIVE PIXEL | YES | YES | YES |
| 10 | NOT USED | | | |
| 11 | NOT USED | | | |

FIG. 8A

DETERMINATION THRESHOLD VALUE
FOR NONSTEADY DEFECTIVE PIXEL DETECTION

| Ktn | DEFECT ID _n_LEVEL (3bit) | ABNORMAL OUTPUT SIGNAL LEVEL (mV) |
|---|---|---|
| Kt1 | 000 | 80 mV OR MORE DURING DEFECTIVE PIXEL DETECTION DEFECT ID_n LEVEL |
| Kt2 | 001 | 65 mV OR MORE DURING DEFECTIVE PIXEL DETECTION DEFECT ID_n LEVEL |
| Kt3 | 010 | 50 mV OR MORE DURING DEFECTIVE PIXEL DETECTION DEFECT ID_n LEVEL |
| Kt4 | 011 | 35 mV OR MORE DURING DEFECTIVE PIXEL DETECTION DEFECT ID_n LEVEL |
| Kt5 | 100 | 25 mV OR MORE DURING DEFECTIVE PIXEL DETECTION DEFECT ID_n LEVEL |
| Kt6 | 101 | 15 mV OR MORE DURING DEFECTIVE PIXEL DETECTION DEFECT ID_n LEVEL |
| Kt7 | 110 | 7 mV OR MORE DURING DEFECTIVE PIXEL DETECTION DEFECT ID_n LEVEL |
| Kt8 | 111 | 5 mV OR MORE DURING DEFECTIVE PIXEL DETECTION DEFECT ID_n LEVEL |

FIG. 8B

DETERMINATION THRESHOLD VALUE
FOR STEADY DEFECTIVE PIXEL DETECTION

| Kun | DEFECT ID _n_LEVEL (3bit) | ABNORMAL OUTPUT SIGNAL LEVEL (mV) |
|---|---|---|
| Ku1 | 000 | 120 mV OR MORE DURING DEFECTIVE PIXEL DETECTION DEFECT ID_n LEVEL |
| Ku2 | 001 | 90 mV OR MORE DURING DEFECTIVE PIXEL DETECTION DEFECT ID_n LEVEL |
| Ku3 | 010 | 70 mV OR MORE DURING DEFECTIVE PIXEL DETECTION DEFECT ID_n LEVEL |
| Ku4 | 011 | 50 mV OR MORE DURING DEFECTIVE PIXEL DETECTION DEFECT ID_n LEVEL |
| Ku5 | 100 | 35 mV OR MORE DURING DEFECTIVE PIXEL DETECTION DEFECT ID_n LEVEL |
| Ku6 | 101 | 20 mV OR MORE DURING DEFECTIVE PIXEL DETECTION DEFECT ID_n LEVEL |
| Ku7 | 110 | 10 mV OR MORE DURING DEFECTIVE PIXEL DETECTION DEFECT ID_n LEVEL |
| Ku8 | 111 | 5 mV OR MORE DURING DEFECTIVE PIXEL DETECTION DEFECT ID_n LEVEL |

FIG. 9A

EXAMPLE OF CORRECTION TABLE FOR STEADY DEFECTIVE PIXELS (ISO100)

| TEMPERATURE \ CHARGE ACCUMULATION PERIOD | ~1/30s | ~1s | ~15s |
|---|---|---|---|
| ~20°C | Ku1 | Ku1~Ku2 | Ku1~Ku4 |
| 20°C~30°C | Ku1~Ku2 | Ku1~Ku3 | Ku1~Ku5 |
| 30°C~40°C | Ku1~Ku3 | Ku1~Ku4 | Ku1~Ku6 |
| 40°C~50°C | Ku1~Ku4 | Ku1~Ku5 | Ku1~Ku7 |
| 50°C~ | Ku1~Ku5 | Ku1~Ku6 | Ku1~Ku8 |

FIG. 9B

EXAMPLE OF CORRECTION TABLE FOR STEADY DEFECTIVE PIXELS (ISO1600)

| TEMPERATURE \ CHARGE ACCUMULATION PERIOD | ~1/30s | ~1s | ~15s |
|---|---|---|---|
| ~20°C | Ku1~Ku4 | Ku1~Ku5 | Ku1~Ku7 |
| 20°C~30°C | Ku1~Ku5 | Ku1~Ku6 | Ku1~Ku8 |
| 30°C~40°C | Ku1~Ku6 | Ku1~Ku7 | Ku1~Ku8 |
| 40°C~50°C | Ku1~Ku7 | Ku1~Ku8 | Ku1~Ku8 |
| 50°C~ | Ku1~Ku8 | Ku1~Ku8 | Ku1~Ku8 |

FIG. 9C

EXAMPLE OF CORRECTION TABLE
FOR NONSTEADY DEFECTIVE PIXELS (ISO100)

| TEMPERATURE \ CHARGE ACCUMULATION PERIOD | ~1/30s | ~1s | ~15s |
|---|---|---|---|
| ~20°C | Kt1~Kt4 | Kt1~Kt4 | Kt1~Kt4 |
| 20°C~30°C | Kt1~Kt4 | Kt1~Kt4 | Kt1~Kt4 |
| 30°C~40°C | Kt1~Kt4 | Kt1~Kt4 | Kt1~Kt4 |
| 40°C~50°C | Kt1~Kt4 | Kt1~Kt4 | Kt1~Kt4 |
| 50°C~ | Kt1~Kt4 | Kt1~Kt4 | Kt1~Kt4 |

FIG. 9D

EXAMPLE OF CORRECTION TABLE
FOR NONSTEADY DEFECTIVE PIXELS (ISO1600)

| TEMPERATURE \ CHARGE ACCUMULATION PERIOD | ~1/30s | ~1s | ~15s |
|---|---|---|---|
| ~20°C | Kt1~Kt8 | Kt1~Kt8 | Kt1~Kt8 |
| 20°C~30°C | Kt1~Kt8 | Kt1~Kt8 | Kt1~Kt8 |
| 30°C~40°C | Kt1~Kt8 | Kt1~Kt8 | Kt1~Kt8 |
| 40°C~50°C | Kt1~Kt8 | Kt1~Kt8 | Kt1~Kt8 |
| 50°C~ | Kt1~Kt8 | Kt1~Kt8 | Kt1~Kt8 |

DEFECTIVE PIXEL DATA CORRECTING APPARATUS, IMAGE CAPTURING APPARATUS, AND METHOD FOR CORRECTING DEFECTIVE PIXEL DATA

BACKGROUND OF THE INVENTION

1. Field of the Invention

The present invention relates to a defective pixel data correcting apparatus, an image capturing apparatus, and a method for correcting defective pixel data, and more particularly relates to a technique for correcting a defective pixel of an image sensor.

2. Description of the Related Art

Digital cameras and digital video cameras use image sensors typified by CMOS image sensors and CCD image sensors. While the image sensors each have hundreds of thousands to tens of millions of pixels arranged, the image sensors include a pixel which fails to generate a signal to be output from the pixel (hereinafter, referred to as a normal output signal), due to crystal faults of a material forming the image sensor and dust. Such a pixel is referred to as a defective pixel, and an abnormal signal output by the defective pixel is referred to as an abnormal output signal in the specification. It is to be noted that the output of an abnormal output signal may include a state in which no signal is output at all.

Defective pixels are classified broadly into two main categories: steady defective pixels which output an abnormal output signal in a steady manner; and nonsteady defective pixels which output a normal output signal and an abnormal output signal in an unsteady manner.

It is known that the output characteristics for abnormal signals differ between steady defective pixels and nonsteady defective pixels in CMOS image sensors. In the case of excluding sensitivity dependent defective pixels such as dust and aperture unevenness, white defects due to crystal faults of a light receiving unit make up a majority of steady defective pixels. Therefore, a white defective pixel is defined as a steady defective pixel. Since the white defective pixel is accompanied by an increase in dark signal, the abnormal signal output level has characteristics that depend on the temperature of the defective pixel and the charge accumulation period of the defective pixel.

On the other hand, nonsteady defective pixels differ from steady defective pixels in points where crystal faults are caused, and the characteristics of the abnormal output signal level for the nonsteady defective pixels thus have almost no dependence on the temperature or charge accumulation period of the defective pixel.

In a general circuit configuration for a pixel of a CMOS image sensor, shown in FIG. 6, reference numerals 801 and 802 respectively denote a photodiode (PD) and a reset CMOS for resetting accumulated electric charges. In addition, reference numerals 803 and 804 respectively denote a floating diffusion (FD) for detecting electric charges and a pixel source follower.

Then, many steady defective pixels are caused by crystal faults of the PD 801, whereas nonsteady defective pixels are considered to be caused by repeating electron capture and electron emission at the interface state of a MOS transistor constituting the pixel source follower 804. The abnormal output signal levels for the nonsteady defective pixels have almost no dependence on the temperature or the charge accumulation period because the pixel source follower 804 causes the abnormality.

Conventionally, a technique has been proposed for appropriately correcting nonsteady defective pixels and steady defective pixels by changing the correction method depending on the type of defective pixels (Japanese Patent Laid-Open No. 2008-131273).

However, Japanese Patent Laid-Open No. 2008-131273 fails to take into particular consideration the fact that the dependence of the abnormal signal output level on the pixel temperature and charge accumulation period differs between nonsteady defective pixels and steady defective pixels. Therefore, in a case in which the pixel temperature or charge accumulation period differs between during defective pixel detection and during subject image capturing, there is a possibility that the correction to, in particular, nonsteady defective pixels is not appropriately carried out due to the difference in dependence as described above. For example, in a case in which a defective pixel to be corrected is to be selected while a steady defective pixel highly dependent on the temperature and charge accumulation period is used as a standard, a nonsteady defective pixel to be corrected is not selected or a nonsteady defective pixel not to be corrected is selected. In the former case, the correction has not been completed, thereby resulting in insufficient correction to noise of the image. In the latter case, unnecessary correction is carried out, thereby resulting in the problem of degradation in resolution.

SUMMARY OF THE INVENTION

The present invention has been made light of the problems of the conventional art described above. The present invention provides a defective pixel data correcting apparatus for carrying out appropriate defective pixel correction in view of the fact that the dependence of the abnormal signal output level on an image capturing condition differs depending on the type of defective pixel, and an image capturing apparatus including the defective pixel data correcting apparatus, as well as a method for correcting defective pixel data.

According to one aspect of the present invention, there is provided a defective pixel data correcting apparatus for correcting defective pixel data output from a defective pixel of an image sensor, the defective pixel data contained in image data captured using the image sensor comprising a plurality of pixels, the defective pixel data correcting apparatus comprising: a correction unit adapted to correct the defective image data based on an image capturing condition for the image data and a type of the defective pixel.

According to another aspect of the present invention, there is provided an image capturing apparatus comprising: the image sensor; and the defective pixel data correcting apparatus according to the present invention.

According to still another aspect of the present invention, there is provided a defective pixel data correction method for correcting defective pixel data output from a defective pixel of an image sensor, the defective pixel data contained in image data captured using the image sensor comprising a plurality of pixels, the defective pixel data correction method comprising: a correction step of correcting the defective image data based on an image capturing condition for the image data and a type of the defective pixel.

Further features of the present invention will become apparent from the following description of exemplary embodiments with reference to the attached drawings.

BRIEF DESCRIPTION OF THE DRAWINGS

FIG. 1 is a block diagram illustrating a configuration example of a digital still camera as an example of an image capturing apparatus according to an embodiment of the present invention;

FIG. 7A is a diagram illustrating a configuration example of data of defective pixel information in an embodiment, whereas FIG. 7B is a diagram showing an example of defect ID_n of defective pixel information;

FIGS. 8A and 8B are diagrams showing examples of a threshold value Ktn for nonsteady defective pixel determination and a threshold value Kun for steady defective pixel determination in an embodiment; and FIGS. 9A to 9D are diagrams showing examples of defective pixel correction tables in an embodiment.

DESCRIPTION OF THE EMBODIMENTS

Figure 2A:
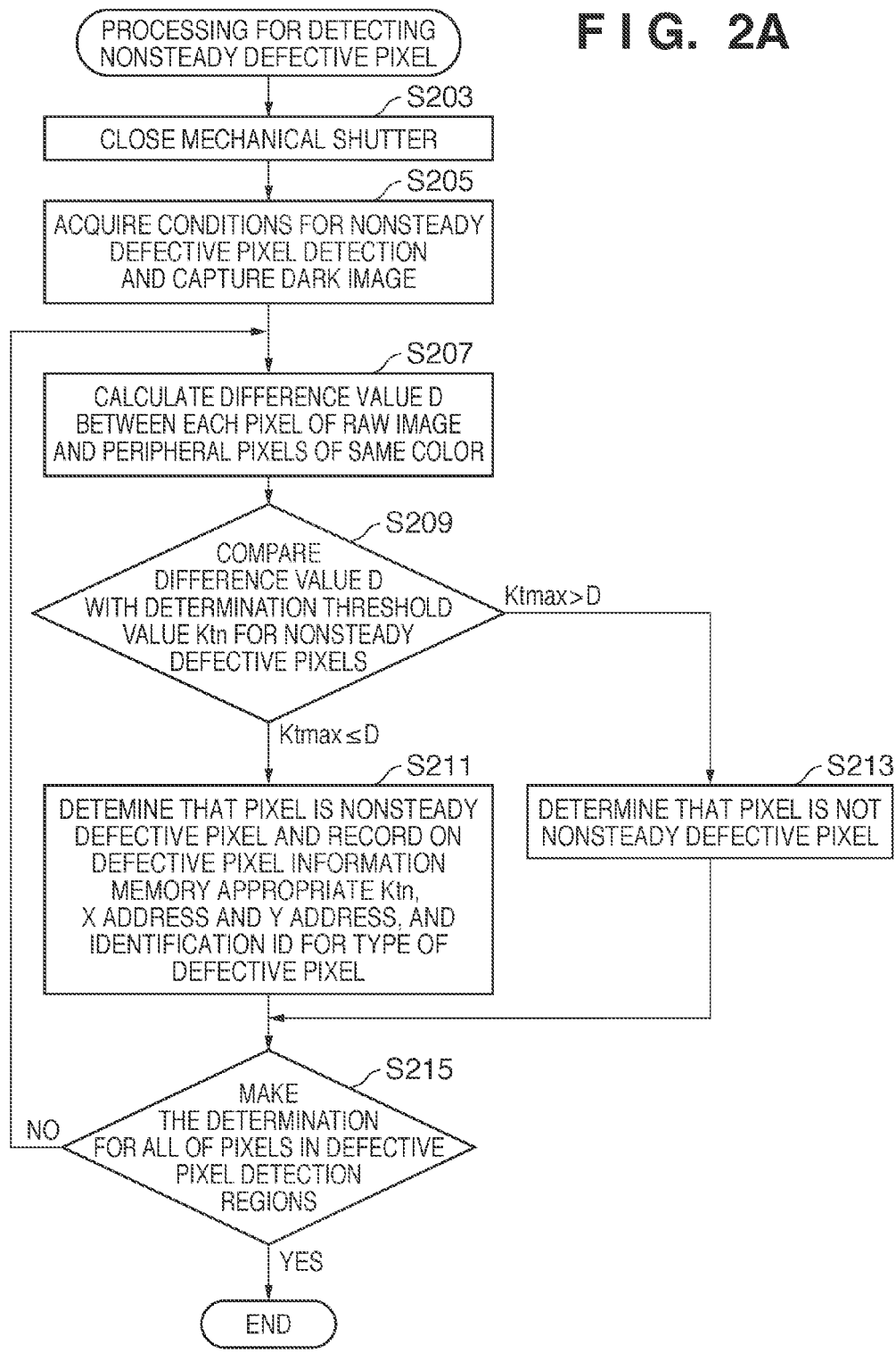
FIG. 2A is a flowchart for explaining details of processing for detecting a nonsteady defective pixel in an embodiment.

Exemplary embodiments of the present invention will now be described in detail in accordance with the accompanying drawings.

FIG. 1 is a block diagram illustrating a configuration example of a digital still camera 120 as an example of an image capturing apparatus including a defective pixel data correcting apparatus according to an embodiment of the present invention.

An image sensor 102 is a photoelectric conversion element, which converts a subject optical image into analog video signals on a pixel basis, and outputs the analog image signals. The image sensor 102 is, for example, a CMOS image sensor. A lens 100 forms a subject optical image onto the image sensor 102. A mechanical shutter 101 opens and closes an optical path between the lens 100 and the image sensor 102. A timing generator (TG) 103 generates a driving signal for the image sensor 102.

An A/D conversion circuit 104 converts analog image signals output from the image sensor 102, to digital image signals. An image memory 106 of a storage unit 105 temporarily stores the digital image signals as RAW image data. The storage unit 105 is composed of, for example, a semiconductor storage apparatus. In addition, the image memory 106 is, for example, a DRAM.

The storage unit 105 includes the image memory 106, a defective pixel information memory 107, a defective pixel correction table 108, and a defective pixel detection condition table 109. Detailed operation of the storage unit 105 will be described later.

A defective pixel determination circuit 110 determines a defective pixel along with the type of the defective pixel, and further determines an abnormal output signal level (defective output level). In the present embodiment, the defective pixel determination circuit 110 determines whether the detected defective pixel is a nonsteady defective pixel or a steady defective pixel. Further, the defective pixel determination circuit 110 may be configured to so as to allow other defective pixels to be determined.

A defective pixel correction circuit 111 corrects a pixel determined as a defective pixel in the defective pixel determination circuit 110, depending on the type of the pixel.

An image processing circuit 112 applies predetermined image processing to RAW image data temporarily stored in the image memory 106, and converts the RAW image data into a final output image format, for example, into a JPEG format based on DCF. The DCF herein refers to an abbreviation of an image format for a digital camera (Design rule for Camera File system). Then, the image processing circuit 112 stores, in a storage medium 113, a captured image converted into a final output image format. The storage medium 113 is, for example, a semiconductor memory card.

A temperature detection unit 115 detects the temperature of the image sensor 102 and the temperature (environmental temperature) near the image sensor 102. The temperature detection unit 115 is, for example, a thermistor.

A control unit 114 includes, for example, a CPU, a ROM, and RAM, which develops a program stored in the ROM to the RAM, and executes the program in the CPU. Then, the control unit 114 generally controls the operation of the digital still camera, including processing for detecting a defective pixel and processing for correcting a defective pixel as described later.

An operation unit 116 is a group of input devices including various types of buttons and keys such as a power ON/OFF button, a shutter button, a menu button, a direction key, a determination button. When an operator operates the operation unit 116, the operation is detected by the control unit 114. Then, the control unit 114 determines the content of the operation and outputs various types of instructions to the digital still camera 120.

(Processing for Detecting Defective Pixel)

Next, an example of a method for detecting a defective pixel, carried out by the digital still camera in the present embodiment, will be described with reference to flowcharts in FIGS. 2A and 2B.

The processing for detecting a defective pixel in the present embodiment is composed of processing for detecting a nonsteady defective pixel and processing for detecting a steady defective pixel. As described above, the nonsteady defective pixel and the steady defective pixel are different from each other in the dependence of output characteristics of the abnormal output signal level on temperature and charge accumulation period. Thus, the condition for detecting a defective pixel differs between the nonsteady defective pixel and the steady defective pixel.

Figures 4, 5, 6:
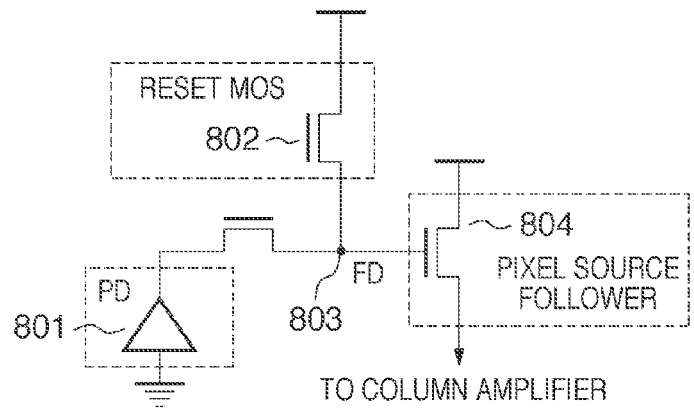
FIG. 4 is a diagram showing an example of a condition table for defective pixel detection in an embodiment.
FIG. 5 is a diagram illustrating an image sensor including color filters in a Bayer arrangement of primary colors, for 5×5 pixels with a red pixel centered.
FIG. 6 is a diagram illustrating a general circuit configuration of a pixel of a CMOS image sensor.

In the present embodiment, a white defective pixel which repeats electron capture and electron emission at the interface state of the MOS transistor of the pixel source follower 804 in FIG. 6, or a black defective pixel is defined as a nonsteady defective pixel. In addition, a white defective pixel caused due to a crystal fault of the PD 801 in FIG. 6 is defined as a steady defective pixel. It is to be noted that the types of defective pixels are not limited to the two types of a nonsteady defective pixel and a steady defective pixel, and may be classified into three or more types.

Figure 2B:
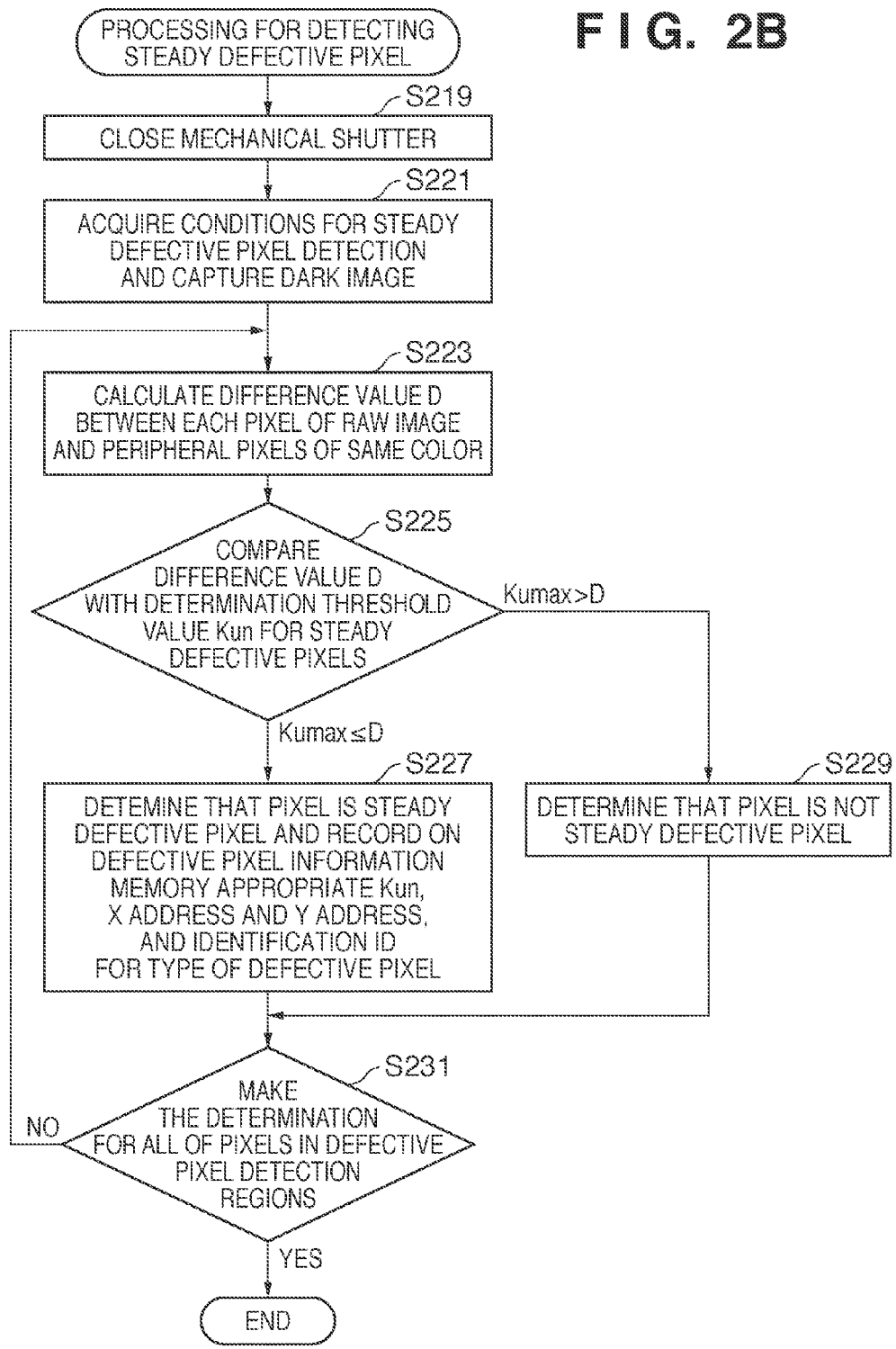
FIG. 2B is a flowchart for explaining details of processing for detecting a steady defective pixel in an embodiment.

FIG. 2A is a flowchart for explaining details of processing for detecting a nonsteady defective pixel.

When a photographer operates the power ON/OFF button included in the operation unit 116 to give an instruction to power on the digital still camera 120, the control unit 114 initiates processing for starting up the camera. Then, the control unit 114 executes processing for detecting a nonsteady defective pixel as shown in FIG. 2A, as part of the processing for starting up.

As described above, the abnormal output signal level of a nonsteady defective pixel has almost no temperature dependence. Therefore, in the present embodiment, a nonsteady defective pixel is detected during power-on operation less likely to be affected by steady defective pixels, in which it is assumed that the digital still camera (in particular, near the image sensor 102) has a lower temperature.

In step S203, the mechanical shutter 101 is closed in order to capture a dark image for defective pixel detection. Next, in step S205, conditions for detecting nonsteady defective pixels are acquired from the defective pixel detection condition table 109, and a dark RAW image is captured under the acquired conditions for detecting defective pixels.

FIG. 4 shows examples of image capturing conditions for detecting nonsteady defective pixels and image capturing conditions for detecting steady defective pixels, which are contained in the defective pixel detection condition table 109. In the embodiment, a dark RAW image is captured in accordance with the capturing conditions for detecting nonsteady defective pixels, shown in FIG. 4.

The steady defective pixel generates an abnormal output signal level at a certain temperature, whereas the abnormal output signal level of the nonsteady defective pixel has almost no temperature dependence. Thus, in order to allow the nonsteady defective pixel and the steady defective pixel to be detected distinctly, the nonsteady defective pixel may be detected under the conditions of a lower temperature near the image sensor and a shorter accumulation period. In the present embodiment, a dark RAW image is captured at a temperature of 25° C. or less with the accumulation period set at 1/1000 seconds to detect a nonsteady defective pixel.

In addition, the nonsteady defective pixel has the property of outputting an abnormal output signal in an unsteady manner. Thus, image capturing is carried out more than once (32 times in the present embodiment) within the detection period, and the abnormal output signal level for the nonsteady defective pixel is detected in accordance with a peak hold system based on the maximum output level for each pixel in the obtained multiple captured images.

The more frequently the image capturing for detecting nonsteady defective pixels is carried out, the higher the accuracy of detecting nonsteady defective pixels is, but the total image capturing period required for the detection is increased. Therefore, it is desirable to set the frequency of image capturing in consideration of the detection accuracy and the total image capturing period.

The control unit 114 confirms whether or not the temperature detected by the temperature detection unit 115 is consistent with the image capturing condition, 25° C. or less. If the temperature is consistent with the image capturing condition, the control unit 114 controls the TG 103 and the A/D conversion circuit 104, etc in such a way that image capturing is carried out at a specified accumulation period (electronic shutter speed) of 1/1000 seconds. Then, the dark RAW image data obtained by the image capturing is temporarily stored in the image memory 106. The capturing of a dark RAW image and the storage of the dark RAW image data are repeatedly carried out 32 times.

Next, through the execution of processing from step S207 to step S215, the control unit 114 determines whether or not each pixel of RAW image data is a nonsteady defective pixel.

The image sensor 102 herein has color filters in a Bayer arrangement of primary colors. FIG. 5 is a diagram illustrating an arrangement of color filters provided in each pixel of the image sensor 102, for 5×5 pixels. It is to be noted that while the present embodiment will be described on the premise of color filters in a Bayer arrangement of primary colors, other color filter configurations may be employed.

When the center pixel $R_{33}$ in FIG. 5 is used as a target pixel to be subjected to defective pixel determination, the average value $AVE_{R33}$ for peripheral pixels surrounding the target pixel, which have the same color as that of the target pixel, are obtained as follows in step S207.

$$AVE_{R33}=(R_{11}+R_{13}+R_{15}+R_{31}+R_{35}+R_{51}+R_{53}+R_{55})/8$$

In addition, the difference value $D_{R33}$ between the average value $AVE_{R33}$ and the value $R_{33}$ is obtained in accordance with the following equation.

$$D_{R33}=|R_{33}-AVE_{R33}|$$

In step S209, the control unit 114 controls the defective pixel determination circuit 110 so as to compare the difference value $D_{R33}$ with a determination threshold value Ktn for nonsteady defective pixels. The threshold value for defective pixel determination can be also set for each of detection of nonsteady defective pixels and detection of steady defective pixels. The threshold value for defective pixel determination may be determined in advance with the use of image capturing results under predetermined image capturing conditions.

FIGS. 8A and 8B show examples of a threshold value Ktn for nonsteady defective pixel determination and a threshold value Kun for of steady defective pixel determination in the embodiment. In the present embodiment, the determination threshold value is divided into 8 stages of Kt1 to Kt8 and Ku1 to Ku8, depending on the abnormal output signal level (mV) for a defective pixel.

In addition, the threshold value Ktn for nonsteady defective pixel determination has almost no dependence on temperature or charge accumulation period, and is thus set so as to be divided finely more than the threshold value for steady defective pixel determination. In addition, the threshold value Ktn with its abnormal output signal level corresponding to the smallest stage (Kt8 in FIGS. 8A and 8B) is referred to as Ktmax. The same applies to the threshold value Kun.

Then, in the case of Ktmax>$D_{R33}$, that is, 5 mV>$D_{R33}$, the control unit 114 determines in step S213 that the target pixel $R_{33}$ outputs a normal value, that is, the target pixel $R_{33}$ is not a nonsteady defective pixel.

On the other hand, in the case of Ktmax≤$D_{R33}$, that is, 5 mV≤$D_{R33}$, the control unit 114 determines that the target pixel $R_{33}$ is a nonsteady defective pixel. Then, in step S211, the control unit 114 determines in the defective pixel determination circuit 110, the largest threshold value Ktn satisfied by the target pixel, depending on the value of $D_{R33}$. Then, the control unit 114 records on the defective pixel information memory 107 the following information: (1) a defect level (defect ID_n_level) indicating the determined threshold value Ktn; (2) information specifying the position of $R_{33}$ (for example, a X address and a Y address); and (3) identification ID (defect ID_n) of defective pixel type (nonsteady defective pixel) as defective pixel information.

Figures 7A, 7B:
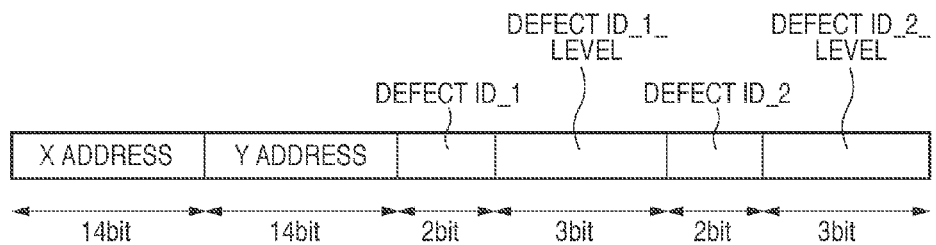

FIG. 7A is a diagram illustrating a data configuration example of defective pixel information, in which a data length of 14 bits is assigned to each of the X address and Y address, a data length of 2 bits is assigned to the defect ID_n, and a data length of 3 bits is assigned to the defect ID_n_level.

In this case, the defect ID_n of the 2-bit length refers to ID for identifying the type of the defective pixel, and up to 4 types of defective pixels can be identified depending on combinations of the presence or absence of accumulation period dependence, temperature dependence, and ISO speed dependence, as shown in FIG. 7B. However, defective pixels to be identified in the present embodiment include the two types of nonsteady defective pixels and steady defective pixels.

The control unit 114 newly records defective pixel information on $R_{33}$ on the defective pixel information memory 107 in step S211, if the defective pixel information is not recorded on the defective pixel information memory 107. On the other hand, if the defective pixel information on $R_{33}$ has been already recorded on the defective pixel information memory 107, the control units 114 merges the already recorded defective pixel information and nonsteady defective pixel address information, and records the information on the defective pixel information memory 107.

The control unit 114 repeatedly carries out the processing from step S207 to step S215 described above for all of the pixels in the defective pixel detection regions, and ends the nonsteady defective pixel detection.

Next, details of processing for detecting a steady defective pixel will be described with reference to a flowchart shown in FIG. 2B. FIG. 2B is a flowchart for explaining details of the processing for detecting a steady defective pixel.

When a photographer operates the power ON/OFF button included in the operation unit 116 to give an instruction to power off the digital still camera 120, the control unit 114 initiates processing for ending the operation of the camera. Then, the control unit 114 executes processing for detecting a steady defective pixel as shown in FIG. 2B, as part of the processing for ending the operation.

The abnormal output signal level of a steady defective pixel has temperature dependence as described above. Therefore, in the present embodiment, steady defective pixel detection is carried out during power-off operation in which it is assumed that the digital still camera (in particular, near the image sensor 102) has a higher temperature.

Then, in step S219 to step S231, the control unit 114 detects a steady defective pixel in the same way as in step S203 to step S215 in the processing for detecting a nonsteady defective pixel. However, the conditions for capturing a dark image (FIG. 4) are different in step S221. In particular, it is sufficient if the image capturing is carried out once, and it is thus unnecessary to obtain the maximum value for each pixel. This is because the steady defective pixel steadily outputs an abnormal output signal. In addition, the processing for detecting a steady defective pixel differs in that the threshold voltage used for comparison in step S225 is a threshold value Ku8 for steady defective pixel determination (=Kumax).

In this way, defective pixel information is recorded on the defective pixel information memory 107, on each of nonsteady defective pixels and steady defective pixels which differ from each other in the dependence on temperature and charge accumulation period.

It is to be noted that while a case has been described in which the processing for detecting a nonsteady defective pixel is carried out in the power-on state of the digital still camera whereas the processing for detecting a steady defective pixel is carried out in the power-off state of the digital still camera in the present embodiment, the execution timing of the processing for detecting a nonsteady defective pixel or a steady defective pixel can be arbitrarily set. For example, the processing for detecting a nonsteady defective pixel or a steady defective pixel can be carried out in factory coordination before shipment of the digital still camera, or executed in a case in which it is determined whether the temperature of the image sensor 102 meets the image capturing condition or not and the temperature meets the image capturing condition.

(Defective Pixel Correction Processing)

Next, processing for correcting a defective pixel will be described in the digital still camera according to the present embodiment. The processing for correcting a defective pixel is executed with respect to image data output from a defective pixel (defective pixel data), which is contained in captured image data of a subject image captured by the user and recorded on the image memory 106.

When the shutter button included in the operation unit 116 is pressed fully to give an instruction to start image capturing from the user, the control unit 114 executes the operation of capturing an image. More specifically, the control unit 114 controls the focal length of the lens 100 and the opening and closing of the mechanical shutter 101, and exposures the image sensor 102 to light, in accordance with image capturing conditions determined with the use of well known functions such as an automatic focus detecting function and an automatic exposure control function. Then, the control unit 114 instructs the TG 103 to output a timing signal, in such away that an analog video signal is read out from each pixel of the image sensor 102 and supplied to the A/D conversion circuit 104. The A/D conversion circuit 104 converts the analog video signals to digital video signals, and records the digital video signals on the image memory 106 as RAW image data.

Figure 3:
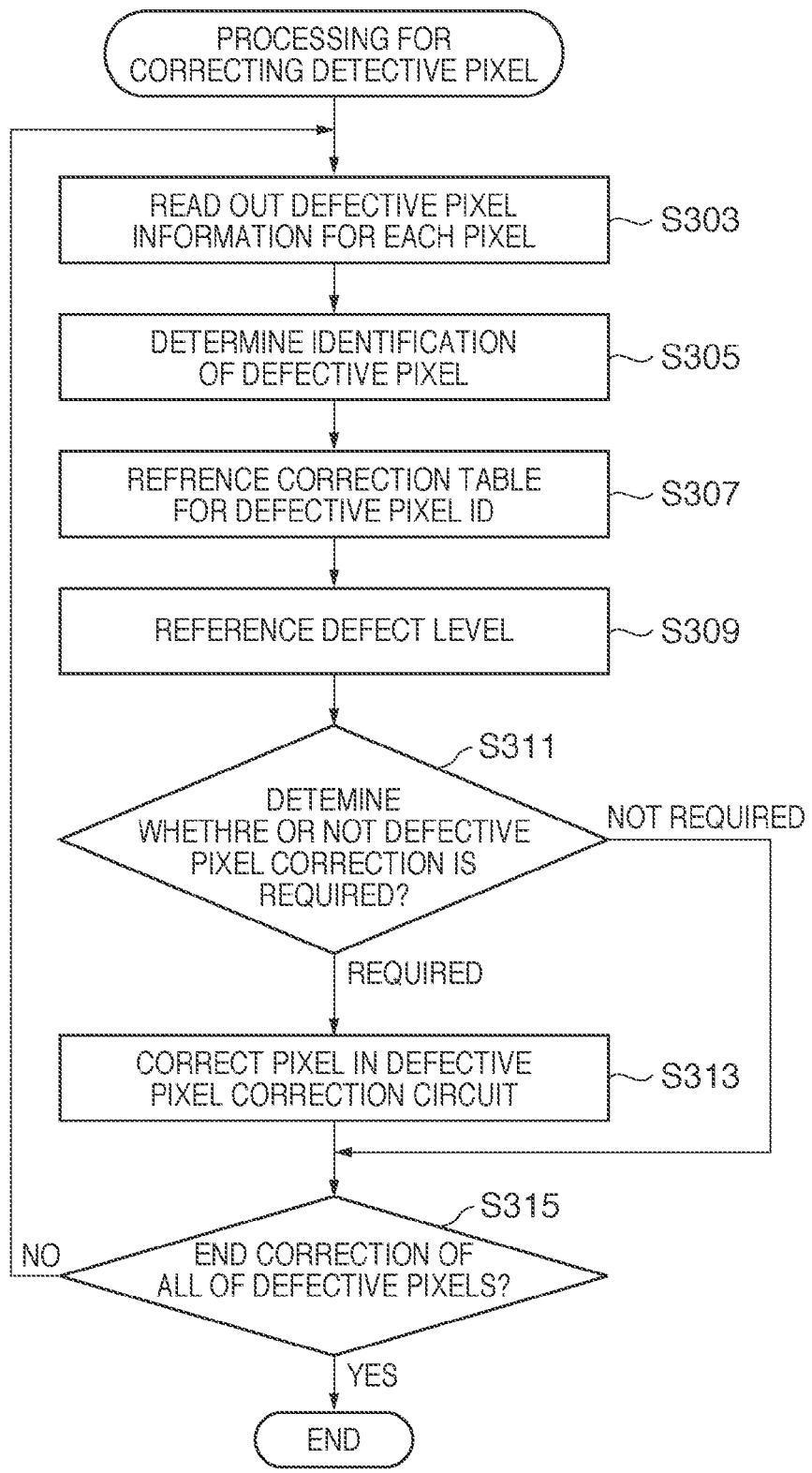
FIG. 3 is a flowchart for explaining details of processing for correcting a defective pixel in an embodiment.

Subsequently, the control unit 114 executes the processing for correcting a defective pixel, as shown in the flowchart of FIG. 3. In step S303, the control unit 114 reads out defective pixel information for each pixel from the defective pixel information memory 107, and supplies the defective pixel information to the defective pixel determination circuit 110. In step S305, the defective pixel determination circuit 110 determines the type of the defective pixel to be subjected to correction from identification ID (defect ID_n) for the defective pixel type contained in the supplied defective pixel information, and supplies the determination result to the defective pixel correction circuit 111.

In step S307, the defective pixel correction circuit 111 references the defective pixel correction table 108 corresponding to the type of the defective pixel determined by the defective pixel determination circuit 110 in step S305 to acquire the range of the defect level to be corrected. The defective pixel correction table 108 is a table for determining defective pixels to be subjected correction (the range of the defect level) depending on the conditions for capturing images to be subjected to correction. In other words, the defective pixel correction table 108 is a table for determining whether or not the defective pixel data needs to be corrected based on the conditions for capturing images to be subjected to correction and on the types of defective pixels. It is to be noted that while the image capturing conditions are the temperature, the charge accumulation period (shutter speed or exposure period), and the ISO speed in the present embodiment, the conditions are not limited these conditions, and may include other image capturing conditions.

FIGS. 9A to 9D are examples of the defective pixel correction table 108. In FIGS. 9A to 9D, Kt1 to Kt8 and Ku1 to Ku8 are equal to the threshold values shown in FIGS. 8A and 8B. In the defective pixel correction table 108, the Kt1 means that the nonsteady defective pixel with Kt1 as the maximum threshold value (that is, the defect level) satisfied by the abnormal output signal level is a nonsteady defective pixel to be subjected to correction (correction required). Accordingly, the Kt1 to Kt8 means that all of the nonsteady defective pixels are to be subjected to correction. The same applies to the Ku1 to Ku8.

FIGS. 9A and 9B show examples of the correction table for steady defective pixels, which correspond to ISO speeds of 100 and 1600, whereas FIGS. 9C and 9D show examples of the correction table for nonsteady defective pixels, which correspond to ISO speeds of 100 and 1600. Further, although not shown in the figures, correction table corresponding to other ISO speeds are also prepared in the defective pixel correction table 108.

The correction tables for steady defective pixels, shown in FIGS. 9A and 9B, are configured in such a way that the higher the temperature is, and the longer the charge accumulation period (the higher the electronic shutter speed) is, the more the range of the abnormal output signal level (defect level) to be subjected to correction is increased. This is because the steady defective pixels have characteristics in that the higher the temperature is, and the longer the charge accumulation period is, the higher level of abnormal output signal is output. For example, under the image capturing conditions of the highest temperature (around 50° C.) and the longest charge accumulation period (around 15 s), all of the steady defective pixels are to be subjected to correction, regardless of the defective level.

On the other hand, the abnormal output signal level for nonsteady defective pixels has almost no dependence on the temperature or charge accumulation period. Therefore, in the correction tables for nonsteady defective pixels, shown in FIGS. 9C and 9D, the range of the abnormal output signal level (defect level) to be subjected to correction does not vary with temperature or charge accumulation period. Thus, at the same ISO speed, a defective pixel correction table is provided which has the same range of defect levels for nonsteady defective pixels to be subjected to correction, even with changes in the temperature or charge accumulation period. On the other hand, the higher ISO speed results in a wider range of defect levels for nonsteady defective pixels to be subjected to correction in the same way as steady defective pixels.

As described above, in the present embodiment, the correction tables corresponding to the image capturing conditions are prepared for each type of defective pixels, in view of the fact that the dependence of the abnormal output signal level on the temperature and the charge accumulation period differs between nonsteady defective pixels and steady defective pixels. Then, the correction table corresponding to the type of the defective pixel is used to carry out defective pixel correction.

In step S309, the defective pixel correction circuit 111 references the defect level (defect ID_n_level) for a defective pixel to be subjected to correction, from the defective pixel information recorded on the defective pixel information memory 107. Then, in step S311, the defective pixel correction circuit 111 determines whether or not the defect level of each defective pixel is included in the range of Ktn or Kun shown in the correction table 108, and determines that the correction is required if the defect level is included or that the correction is not required if the defect level is not included.

For example, it is assumed that the type of defective pixel is a steady defective pixel, the detection temperature indicated by the temperature detection unit 115 during image capturing is 25° C., the charge accumulation period (electronic shutter speed) is 1/60 seconds, and the ISO speed if 100. In this case, the reference to the correction table for steady defective pixels in FIG. 9A finds that steady defective pixels with the abnormal output signal level of Ku1 to Ku2 are to be subjected to correction. Therefore, the defective pixel correction circuit 111 determines that the correction is required if the defect level for the defective pixels stored in the defective pixel information memory 107 is Ku1 or Ku2, whereas the defective pixel correction circuit 111 determines that the defective pixel correction is not required if the defect level for the defective pixels stored in the defective pixel information memory 107 is Ku3 to Ku8.

Then, in a case in which it is determined that the correction is required in step S311, the processing proceeds to step S313, in which the defective pixel correction circuit 111 executes the processing for correcting a defective pixel with respect to the pixel to be subjected to correction, based on the defective pixel information recorded on the defective pixel information memory 107. In a case in which the method for correcting a defective pixel differs depending on the type of the defective pixel, the defective pixel correction circuit 111 uses a defect correction method depending on the type of the defective pixel to carry out the correction processing. The defective pixel correction circuit 111 writes corrected pixel data back into the image memory 106, or supplies the corrected pixel data to the image processing circuit 112. Alternatively, in a case in which it is determined that the correction is not required in step S311, the defective pixel correction circuit 111 makes no correction to the pixel data, but supplies the image data directly to the image processing circuit 112, and the processing proceeds to step S315.

As an example of the defective pixel correcting method for nonsteady defective pixels and steady defective pixels, which is executed in step S313, a method for interpolating pixels of the same color neighboring a defective pixel will be described below.

In a case in which the pixel to be subjected to correction (the pixel $R_{33}$ in FIG. 5 herein) is a defective pixel, the value for the pixel to be subjected to correction is interpolated from the values of the upper and lower or right and left neighboring pixels of the same color. While which pair of pixels, the upper and lower neighboring pixels or the right and left neighboring pixels, are used may be appropriately selected, for example, the pixels are adaptively determined depending on subjects.

As an example of the interpolation method in the case of using the upper and lower neighboring pixels of the same color, the correction can be carried out in accordance with the following formula;

$$R_{33}=(R_{31}+R_{35})\div 2$$

As an example of the interpolation method in the case of using the right and left neighboring pixels of the same color, the correction can be carried out in accordance with the following formula;

$$R_{33}=(R_{13}+R_{53})\div 2$$

In step S315, the control unit 114 confirms whether or not the processing from step S303 to step S313 has been executed with respect to all of the defective pixels recorded on the defective pixel information memory 107, and ends the processing for correcting a defective pixel in a case in which the processing has been executed with respect to all of the recorded defective pixels. If defective pixels are left unprocessed, the processing from step S303 to step S313 is applied to the unprocessed defective pixels.

The RAW image data to which the processing for correcting a defective pixel has been applied is supplied from the image memory 106 to the image processing circuit 112. The image processing circuit 112 applies image processing to the corrected RAW image data, and records the RAW image data on the recording medium 113.

While the approach of correcting an image captured by the user in the defective pixel correction circuit 111 before image processing is applied to the image in the image processing circuit 112 has been described in the present embodiment, the defective pixel correction may be carried out at the same time as the image processing in the image processing circuit 112. In this case, the defective pixel correction circuit 111 is included in the image processing circuit 112.

In addition, a case of applying the processing for correcting a defective pixel to all of defective pixels contained in RAW image data stored temporarily in the image memory 106 and then supplying the corrected RAW image data to the image processing circuit 112 has been described in the present embodiment. However, the RAW image data may be supplied to the image processing circuit 112 sequentially on a pixel basis by sequentially reading out the RAW image data from the image memory 106 and changing the supply path to the image processing circuit 112 depending on whether or not the read pixels are a defective pixel. In this case, the image data is supplied to the image processing circuit 112 via the defective pixel determination circuit 110 and the defective pixel correction circuit 111 if the read pixel is a defective pixel, whereas the image data is supplied to the image processing circuit 112 directly from the image memory 106 if the read pixel is not a defective pixel.

As described above, according to the present embodiment, the defective pixel detection is carried out with the use of the image capturing conditions corresponding to the type of a defective pixel, in view of the fact that the dependence of the abnormal signal output level on an image capturing condition differs depending on the types of defective pixels. Thus, the types of defective pixels can be appropriately recognized.

In addition, in the processing for correcting a defective pixel, a defective pixel to be corrected is determined depending on the image capturing conditions and the type of the defective pixel. Thus, multiple types of defective pixels which differ in the dependence on the image capturing conditions can be appropriately corrected. Therefore, image degradation such as degradation in resolution or increase in noise can be suppressed, which is caused by correcting defective pixels requiring no correction or by failing to correct defective pixels requiring correction.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-184830, filed on Aug. 7, 2009, which is hereby incorporated by reference herein its entirety.

What is claimed is:

1. A defective pixel data correcting apparatus for correcting defective pixel data output from a defective pixel of an image sensor, the defective pixel data contained in image data captured using the image sensor comprising a plurality of pixels, the defective pixel data correcting apparatus comprising:
a first storage unit adapted to store defective pixel information containing a type and a defective output level of a defective pixel, for each defective pixel included in the plurality of pixels;
a second storage unit adapted to store a plurality of correction tables each of which corresponding to one of types of the defective pixel, and associating the image capturing condition and a defective output level to be subjected to correction with each other;
a determination unit adapted to determine whether or not the defective pixel data needs to be corrected, based on the defective pixel information and at least one correction table that corresponds to the type of a defective pixel from which the defective pixel data is obtained, and the image capturing condition; and
a correction unit adapted to correct the defective pixel data that is determined, by the determination unit, to need to be corrected.

2. The defective pixel data correcting apparatus according to claim 1, wherein the type of the defective pixel includes a first defective pixel for irregularly outputting an abnormal level signal and a second defective pixel for regularly outputting an abnormal level signal, and
the image capturing condition includes an environmental temperature of the image sensor and a charge accumulation period of the image sensor.

3. An image capturing apparatus comprising:
the image sensor; and
the defective pixel data correcting apparatus according to claim 1.

4. The image capturing apparatus according to claim 3, further comprising a detection unit for detecting a defective pixel included in the image sensor and a type of the defective pixel, from image data obtained by capturing a dark image using the image sensor under a predetermined image capturing condition,
wherein the predetermined image capturing condition differs depending on the type of the detected defective pixel.

5. The image capturing apparatus according to claim 4, wherein the detection unit detects the first defective pixel and the second defective pixel from the image data obtained by capturing the dark image.

6. A defective pixel data correction method for correcting defective pixel data output from a defective pixel of an image sensor, the defective pixel data contained in image data captured using the image sensor comprising a plurality of pixels, the defective pixel data correction method comprising:
a first storage step of storing defective pixel information containing a type and a defective output level of a defective pixel, for each defective pixel included in the plurality of pixels;
a second storage step of storing a plurality of correction tables each of which corresponding to one of types of the defective pixel, and associating the image capturing condition and a defective output level to be subjected to correction with each other;
a determination step of determining whether or not the defective pixel data needs to be corrected, based on the defective pixel information and at least one correction table that corresponds to the type of a defective pixel from which the defective pixel data is obtained, and the image capturing condition; and
a correction step of correcting the defective pixel data that is determined, by the determination step, to need to be corrected.

* * * * *